(12) United States Patent
Marino et al.

(10) Patent No.: US 6,971,464 B2
(45) Date of Patent: Dec. 6, 2005

(54) DRIVERLESS VEHICLE GUIDANCE SYSTEM AND METHOD

(75) Inventors: Mark Marino, Petoskey, MI (US); Elvin K. Honey, deceased, late of Petoskey, MI (US); by George Lewis, legal representative, Petoskey, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 0 days.

(21) Appl. No.: 10/316,496

(22) Filed: Dec. 11, 2002

(65) Prior Publication Data

US 2003/0106731 A1 Jun. 12, 2003

Related U.S. Application Data

(60) Provisional application No. 60/341,195, filed on Dec. 12, 2001.

(51) Int. Cl.$^7$ .............................. B62D 1/24; B60T 7/16
(52) U.S. Cl. ...................... 180/167; 180/168; 701/23
(58) Field of Search ................................ 180/168, 167, 180/401; 701/23, 27, 207, 210

(56) References Cited

U.S. PATENT DOCUMENTS

| | | | |
|---|---|---|---|
| 3,294,178 A | 12/1966 | Lawson et al. | |
| 3,768,586 A | 10/1973 | Thompson et al. | |
| 3,993,156 A | 11/1976 | Rubel | |
| 4,006,790 A | 2/1977 | Kawano et al. | |
| 4,079,803 A | 3/1978 | Takada et al. | |
| 4,258,813 A | 3/1981 | Rubel | |
| 4,307,329 A | 12/1981 | Taylor | |
| 4,437,533 A | 3/1984 | Bierkarre et al. | |

(Continued)

FOREIGN PATENT DOCUMENTS

DE 31 35 543 A1 3/1983

(Continued)

OTHER PUBLICATIONS

Discrete Semiconductors—Data Sheet—KMZ51 Magnetic Field Sensor, Philips Semiconductors, Jun. 13, 2000, 8 pages.

Discrete Semiconductors—Data Sheet—KMZ52 Magnetic Field Sensor, Philip Semiconductors, Jun. 9, 2000, 12 pages.

*Primary Examiner*—Christopher P. Ellis
*Assistant Examiner*—Brian Swenson
(74) *Attorney, Agent, or Firm*—Dickinson Wright PLLC (57) ABSTRACT

A vehicle guidance system for guiding a vehicle along a magnetic marker including a first magnetic sensor having a sensing axis, the first sensor measuring a first magnetic field. A second magnetic sensor has a sensing axis, the second sensor measuring a second magnetic field. The sensing axis of the second magnetic sensor crosses the sensing axis of the first magnetic sensor at a vehicle guide point. A processor is configured to receive data representative of the magnetic field measured by the first and second sensors and to calculate a lateral offset between the guide point and the magnetic marker based upon the measured magnetic fields. A method for guiding a vehicle in response to a marker having magnetic field is also disclosed. The steps of the method include measuring magnetic field strength proximate the marker, measuring ambient magnetic field strength remote from the marker, nulling the ambient magnetic field by removing the remote magnetic field strength from the proximate magnetic field strength, calculating a lateral displacement between the vehicle and the marker using the nulled magnetic field strength, and guiding the vehicle in response to the lateral displacement between the vehicle and the marker.

29 Claims, 5 Drawing Sheets

U.S. PATENT DOCUMENTS

| | | | |
|---|---|---|---|
| 4,456,088 A | 6/1984 | Nishiki et al. | |
| 4,520,299 A | 5/1985 | Konrad | |
| 4,530,056 A | 7/1985 | MacKinnon et al. | |
| 4,566,032 A | 1/1986 | Hirooka et al. | |
| 4,656,406 A | 4/1987 | Houskamp | |
| 4,731,582 A * | 3/1988 | Posseme et al. | 324/245 |
| 4,736,812 A * | 4/1988 | Livneh | 180/168 |
| 4,777,601 A | 10/1988 | Boegli | |
| 4,788,498 A | 11/1988 | Uemura | |
| 4,802,096 A | 1/1989 | Hainsworth et al. | |
| 4,817,750 A | 4/1989 | Ishida et al. | |
| 4,855,915 A | 8/1989 | Dallaire | |
| 4,990,841 A | 2/1991 | Elder | |
| 5,072,222 A | 12/1991 | Fockens | |
| 5,191,528 A * | 3/1993 | Yardley et al. | 701/23 |
| 5,216,605 A | 6/1993 | Yardley et al. | |
| 5,244,055 A | 9/1993 | Shimizu | |
| 5,347,456 A * | 9/1994 | Zhang et al. | 701/23 |
| 5,404,087 A | 4/1995 | Sherman | |
| 5,434,781 A | 7/1995 | Alofs et al. | |
| 5,467,084 A | 11/1995 | Alofs et al. | |
| 5,524,723 A | 6/1996 | Gramling et al. | |
| 5,525,884 A | 6/1996 | Sugiura et al. | |
| 5,594,448 A | 1/1997 | d'Hont | |
| 5,617,023 A | 4/1997 | Skalski | |
| 5,619,207 A | 4/1997 | d'Hont | |
| 5,672,947 A | 9/1997 | Hisada et al. | |
| 5,825,481 A | 10/1998 | Alofs et al. | |
| 5,828,968 A | 10/1998 | Iiboshi et al. | |
| 5,883,587 A | 3/1999 | Ikemoto | |
| 5,925,080 A | 7/1999 | Shimbara et al. | |
| 6,049,745 A | 4/2000 | Douglas et al. | |
| 6,272,406 B2 | 8/2001 | Alofs et al. | |
| 6,336,064 B1 | 1/2002 | Honkura et al. | |
| 6,437,561 B1 | 8/2002 | Bartingale et al. | |
| 6,502,031 B2 | 12/2002 | Uehara | |
| 6,512,978 B2 | 1/2003 | Suzuki | |

FOREIGN PATENT DOCUMENTS

| | | |
|---|---|---|
| EP | 0 186 483 | 7/1986 |
| EP | 0 257 688 | 3/1988 |
| GB | 2 075 301 | 11/1981 |
| GB | 2 133 660 | 7/1984 |
| WO | WO 82/00378 | 2/1982 |

* cited by examiner

DRIVERLESS VEHICLE GUIDANCE SYSTEM AND METHOD

CROSS-REFERENCE TO RELATED APPLICATION

This application claims the benefit of U.S. Provisional Application No. 60/341,195, filed Dec. 12, 2001, the entire disclosure of the application is considered part of the disclosure of this application and is hereby incorporated by reference.

BACKGROUND OF THE INVENTION

The present invention is directed to an apparatus and method for guiding a driverless vehicle along a path defined by a magnetic marker such as, for example, a strip of magnetic tape, magnetic paint, or bonded magnetic powder.

Driverless vehicles with automated guidance systems have become increasingly commonplace in industrial applications. These vehicles are used to transport material along predetermined guide paths within a facility. Various methods of guiding the vehicle, such as dead reckoning, electrified guide wires, optical or magnetic markers, and inertial systems, are readily available in the art. However, each of these systems has drawbacks related, for example, to system cost and complexity, installation cost, guide path revision flexibility, and operational accuracy. The sources of these deficiencies can relate to numerous system components including the type of guide path marker as well as the sensor or other system components that locate or track the guide path. For example, in an electrified guide wire system, a conductor wire is buried in the floor of the facility. The vehicle guidance system senses and tracks the magnetic field generated by current passing through the buried wire. These electrified guide wire systems are very accurate during operation but have high installation cost and low guide path revision flexibility as new guide wires must be buried in the floor if the guide path is to be revised. Conversely, inertial guidance systems using wheel encoders and gyroscopes provide high guide path flexibility but are more expensive and complex.

In recent years, the use of driverless vehicle technology within the material handling industry has increased. There has been a corresponding growth in the desire for lower cost driverless vehicles, specifically for lighter duty applications. These lighter duty applications generally require vehicle designs that are less robust than traditional driverless vehicles. However, the need for guidance accuracy, reliability, and flexibility does not diminish with the size of the vehicle. In fact, the need for flexibility and cost efficiencies in the guidance system is generally more acute for less expensive vehicles as the guidance system accounts for a greater percentage of the overall vehicle cost. Accordingly, and in view of the fact that the most accurate and flexible guidance systems are also commonly the most complex and expensive, a need exists for a reliable, flexible, and cost effective automated guidance system that may be used with less robust vehicle designs.

Automated guided carts (AGCs) are representative of this growing market. AGCs are used to transport a variety of relatively light loads throughout assembly facilities. Due to their small size and low vehicle cost, customers commonly desire lower guide path marker installation costs and flexibility in redefining the cart guide path to accommodate revisions to the plant layout or assembly processes. A variety of guide path marking techniques have evolved to begin to address this need. For example, magnetized tape may be disposed on the floor of a facility to mark the guide path. Prior art sensor assemblies for guiding driverless vehicles along magnetic paths include an array of Hall effect switches to magnetically sense marked paths. Examples of these prior art devices include U.S. Pat. No. 4,990,841, issued Feb. 5, 1991 and entitled "Magnetically Guided Vehicle," and U.S. Pat. No. 5,434,781, issued Jul. 18, 1995 and entitled "Method And Apparatus For Guiding A Driverless Vehicle Using A Sensor Tracking A Cable Emitting An Electromagnetic Field."

SUMMARY OF THE INVENTION

A vehicle guidance system for guiding a vehicle along a magnetic marker including a first magnetic sensor having a sensing axis, the first sensor measuring a first magnetic field. A second magnetic sensor has a sensing axis, the second sensor measuring a second magnetic field. The sensing axis of the second magnetic sensor crosses the sensing axis of the first magnetic sensor at a vehicle guide point. A processor is configured to receive data representative of the magnetic field measured by the first and second sensors and to calculate a lateral offset between the guide point and the magnetic marker based upon the measured magnetic fields.

The present invention also provides a method for guiding a vehicle in response to a marker having magnetic field. The steps of the method include measuring magnetic field strength proximate the marker, measuring ambient magnetic field strength remote from the marker, nulling the ambient magnetic field by removing the remote magnetic field strength from the proximate magnetic field strength, calculating an offset or lateral displacement between the vehicle and the marker using the nulled magnetic field strength, and guiding the vehicle in response to the lateral displacement between the vehicle and the marker.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
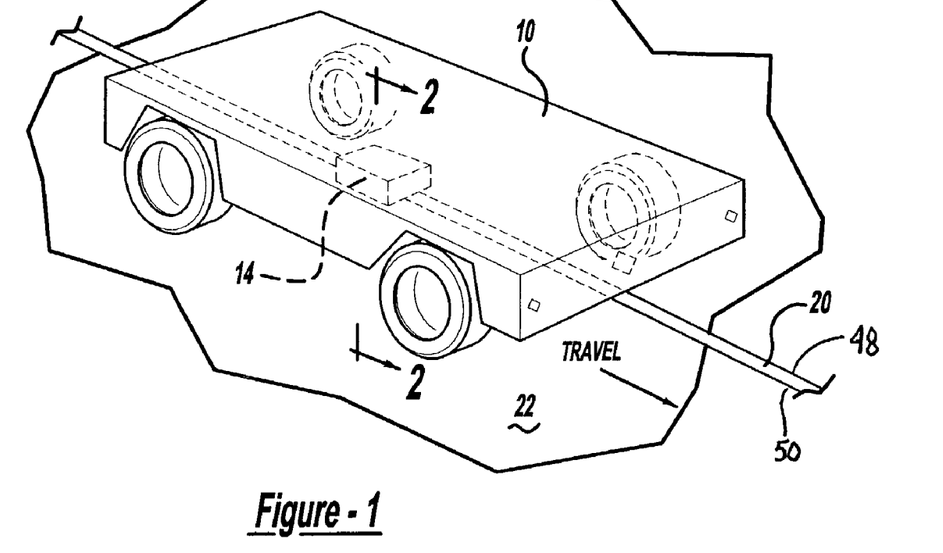
FIG. 1 is a perspective view of a driverless vehicle positioned in operative alignment with a magnetic marker on a floor.

The present invention generally relates to a driverless vehicle including an improved guidance system for tracking a magnetically marked path. In the embodiment illustrated in the attached drawings, particularly FIGS. 1–3, the invention is shown to include a driverless vehicle 10 with a guidance system 12 having a sensor assembly 14, a signal processor 16, and a motion or steering controller 18. As is shown in FIG. 1, the vehicle 10 is configured to follow a magnetic guide path or marker 20 fixed to a floor 22. The guidance system 12, illustrated in FIG. 3, permits active tracking along the path or marker 20. More particularly, as is described in greater detail below, the signal processor 16 receives output signals from the sensor assembly 14 and determines an offset or lateral displacement of the vehicle 10 from the path or marker 20. The signal processor 16 communicates steering control information to the motion controller 18 which then adjusts the movement of the vehicle 10 to track the path or marker 20. The improvements of the present invention are generally directed toward the sensor assembly 14 and the signal processor 16 in order to provide improved accuracy in vehicle position determination relative to the path or marker 20.

Unlike prior driverless vehicle guidance systems, the guidance system 12 of the present invention includes a sensor assembly 14 having a plurality of highly sensitive magnetic field sensors each of which provides an analog output. The magnetic field sensors preferably have a sensitivity on the order of 16(mV/V)/(kA/m). Additionally, the magnetic field sensors preferably have a detectable field change of 1 Gauss or less and, more preferably, of 10 milliGauss or less. In the illustrated embodiment, the magnetic field sensors are giant magnetoresistive (GMR) sensors. While a variety of such sensors are generally known in the art for applications outside of vehicle guidance, the present invention incorporates these highly sensitive magnetic field sensors into a vehicle guidance system to provide improvements over existing guidance systems. While a variety of giant magnetoresistive sensors are available in the art and may be used within the present invention, the described embodiment includes magnetic field sensors distributed by Philips Semiconductors, headquartered in Eindhoven, The Netherlands, as part numbers KMZ51 and KMZ52. Both the KMZ52 and KMZ51 sensors provide uncompensated sensitivity on the order of 16(mV/V)/(kA/m). The KMZ52 magnetic field sensor is a dual Wheatstone bridge sensor having perpendicular major H-field or sensing axes whereas the KMZ51 magnetic field sensor is a single Wheatstone bridge sensor. Further details on the operational capabilities of these and similar sensors are readily available in the art, including through product information at the Philips web site (www.semiconductors.philips.com). Notwithstanding the above-described giant magnetoresistive sensors KMZ52 and KMZ51, those skilled in the art will appreciate that other highly sensitive magnetic field sensors, including Hall effect devices, may also be used without departing from the scope of the present invention.

Figure 2:
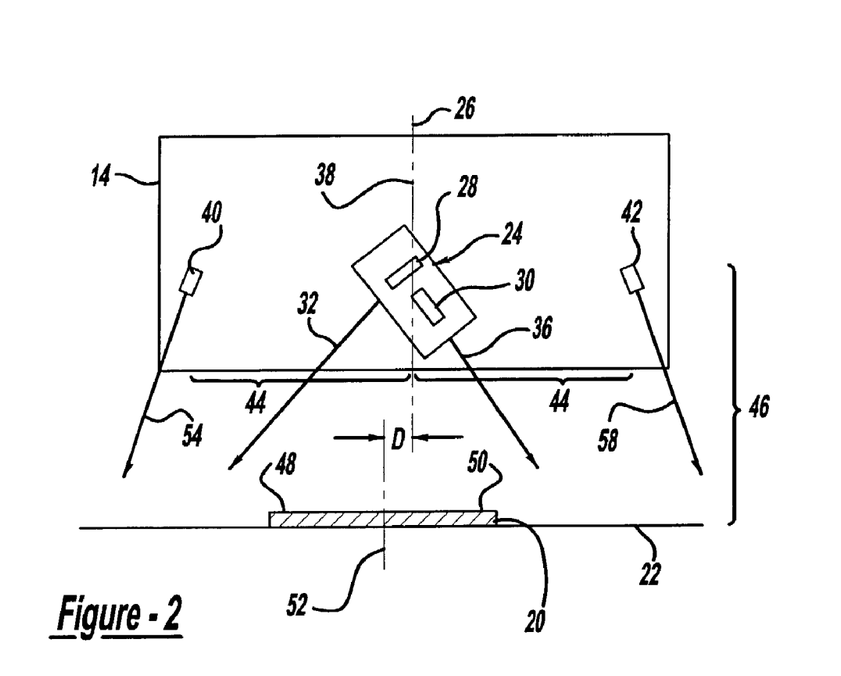
FIG. 2 is a partial cross-sectional view taken along lines 2—2 in FIG. 1 illustrating a magnetic guidance system within the vehicle positioned in operative alignment with the magnetic marker.

As is more fully explained below, the invention detects offset or lateral displacement from the marked guide path 20 which is characterized by the strongest polarized DC magnetic field sensed by the sensor assembly 14. In the illustrated embodiment, the sensor assembly 14 includes a dual bridge giant magnetoresistive (GMR) device 24 schematically illustrated in FIG. 2 to include magnetic field sensors 28 and 30 which are preferably, though not necessarily, mounted and configured in a X-shaped arrangement or "X" configuration such that a major sensing axis 32 of the first magnetic field sensor 28 is oriented at positive forty-five degrees (+45°) relative to a lateral centerline 26 of the vehicle 10 and a major sensing axis 36 of the second magnetic field sensor 30 is oriented at negative forty-five degrees (−45°) relative to the lateral centerline 26 of the vehicle 10, with the major sensing axes 32 and 36 intersecting to define a vehicle guide point 38. As described in greater detail below, the vehicle guide point 38 is the reference point for the vehicle 10 with regard to calculating offset from the path or marker 20. The GMR device 24 may be positioned on the vehicle 10 such that the vehicle guide point 38 is aligned with the lateral centerline 26 of the vehicle 10 as illustrated in FIG. 2 or, alternatively, may be spaced from the vehicle lateral centerline 26. In the latter instance, the lateral vehicle centerline 26 is spaced from the path or marker 20 when the vehicle guide point 38 is aligned with the path or marker 20. Accordingly, the lateral position of the sensor assembly 14 or the vehicle guide point 38 can be spaced from the lateral vehicle centerline 26 so that a steerable wheel, if aligned with the lateral vehicle centerline 26, will not ride on and wear the path 20. The GMR device 24 may be positioned at the front, center, or rear of the vehicle 10. In other words, the GMR device 24 may be positioned at any longitudinal point along the length of the vehicle 10. In the illustrated embodiment, the GMR device 24 consists of a Phillips KMZ52 Magnetic Field Sensor. However, a pair of KMZ51 Magnetic Field Sensors, or similar single bridge sensors, or highly sensitive Hall effect devices may also be used. The non-linear outputs of the GMR device 24 are communicated to the signal processor 16 which then provides a linear result characterizing the location of the strongest polarized DC magnetic field represented by the polarized DC magnetic field of the path or marker 20 as the offset relative to the vehicle guide point 38.

In addition to magnetic field sensors 28 and 30, the sensor assembly 14 of the present invention also includes a pair of ambient magnetic field sensors 40 and 42 spaced laterally a predetermined distance 44 to each side of the vehicle guide point 38 (with one ambient field sensor 40 on the port side of vehicle 10 and the other ambient field sensor 42 on the starboard side of the vehicle 10). The two ambient field sensors 40 and 42 are also preferably set at a forty-five degree (45°) angle outbound from the vehicle guide point 38 as illustrated in FIG. 2. In the illustrated embodiment, the distance 44 between each ambient field sensor 40 and 42 and the vehicle guide point 38 is on the order of two (2) inches and, preferably, one and three-quarters (1.75) inches. While this distance 44 is dependent on the width of the path or marker 20 and other parameters including sensor height 46, the illustrated embodiment of the invention includes a two (2) inch distance 44 for a path or marker 20 having a width of two (2) inches and a sensor height 46 of two (2) inches.

As is more fully explained below, the ambient field sensors 40 and 42 provide magnetic field measurements for use in nulling or compensating for the ambient magnetic field in the surrounding operating environment as well as any magnetic field caused by the vehicle frame to more accurately track the center of the path or marker 20 and, when desired, for guiding the vehicle 10 along the edges 48 and 50 of the magnetized path 20. In the first instance, the measurements from the ambient field sensors 40 and/or 42 are used to correct the data acquired from the GMR device 24 by subtracting out or nulling any uniform background DC magnetic field and vehicle frame DC magnetic field, or a fraction thereof. This nulling feature further enables increased gain for output signals A and B from the magnetic field sensors 28 and 30 respectively and discrimination of very small differences in magnetic field strength between the magnetic field and ambient field sensors 28, 30, 40 and 42. The ability of the guidance system 12 to discriminate small magnetic field strength differences between the magnetic field and ambient field sensors 28, 30, 40, and 42 through the combination of the highly sensitive giant magnetic field sensors 28 and 30 and ambient field nullification feature provides a guidance system 12 which permits the use of magnetic markers having lower strength magnetic fields, such as magnetically impregnated coatings, paint, tape, bonded magnetic powder, and the like. These lower strength magnetic markers are generally less costly to install and more easily accommodate path changes thereby dramatically decreasing installation cost and time. Moreover, the sensor assembly 14 can positively detect the magnetized path or marker 20 and thereby reduce the chance of the vehicle 10 being diverted by ambient magnetic fields which may be caused by otherwise unaccounted for magnetized material in the floor 22.

By way of example rather than limitation, the benefits of the invention include a system which nullifies ambient magnetic fields to permit the vehicle 10 to be guided along lower strength magnetic fields relative to the prior art. More particularly, and without limiting the scope of the invention relative to other features and advantages not found in the prior art, unlike previous applications of magnetoresistive sensor technology, the present invention: (a) nulls the earth's field and/or other uniform ambient fields to discriminate the presence of the marked path or marker 20 and prevent erroneous field detection; (b) orients the magnetic field and ambient field sensors 28, 30, 40, and 42 to sense magnetic media on a horizontal surface; (c) utilizes the phase of the output to establish acceptable operating area; and (d) uses the output in a servo loop for steering.

The output from the two magnetic field sensors 28 and 30 is communicated to the signal processor 16 (FIG. 3) which is configured to process such sensor output and provide a control value to the motion controller 18 that is proportional to the distance to a plane 52 (FIG. 2) drawn perpendicular to the surface of the path or marker 20 and parallel to the length of the path or marker 20. As such, the sensor assembly 14 can be used to measure offset or lateral displacement of the vehicle guide point 38 relative to the path or marker 20 which is useable in a servo loop to control vehicle steering. A representative offset O is shown in FIG. 2 relative to the plane 52 at the centerline of the path or marker 20. However, as is described in greater detail below, the sensor assembly 14 may also track one of the edges 48 or 50 of the path 20.

Figure 3:
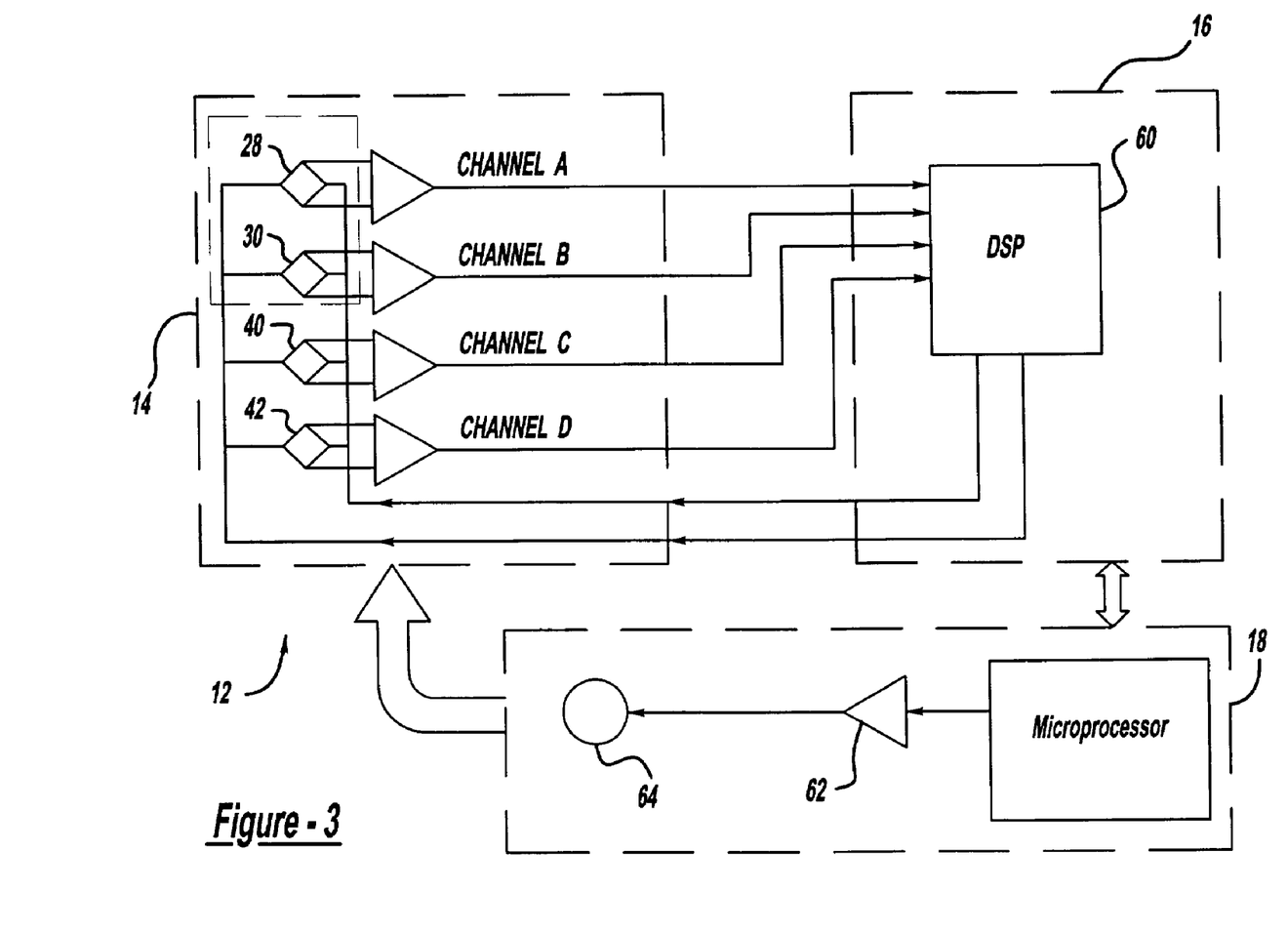
FIG. 3 is an electrical schematic of the magnetic guidance system illustrating a sensor assembly including guidance system sensors, a signal processor, and a motion controller in accordance with the present invention.
Figure 4:
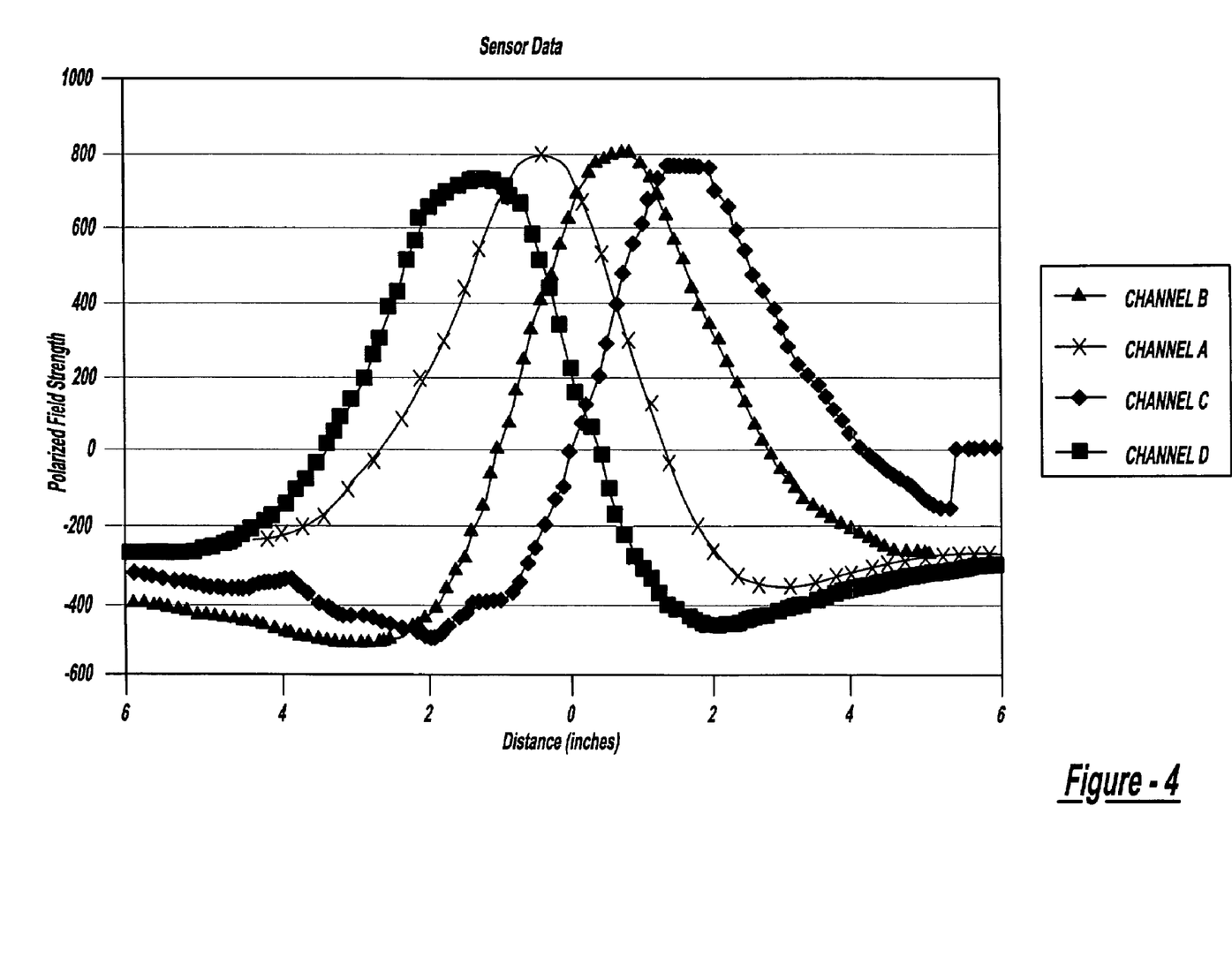
FIG. 4 is a graph illustrating representative output from the guidance system sensors.
Figure 5:
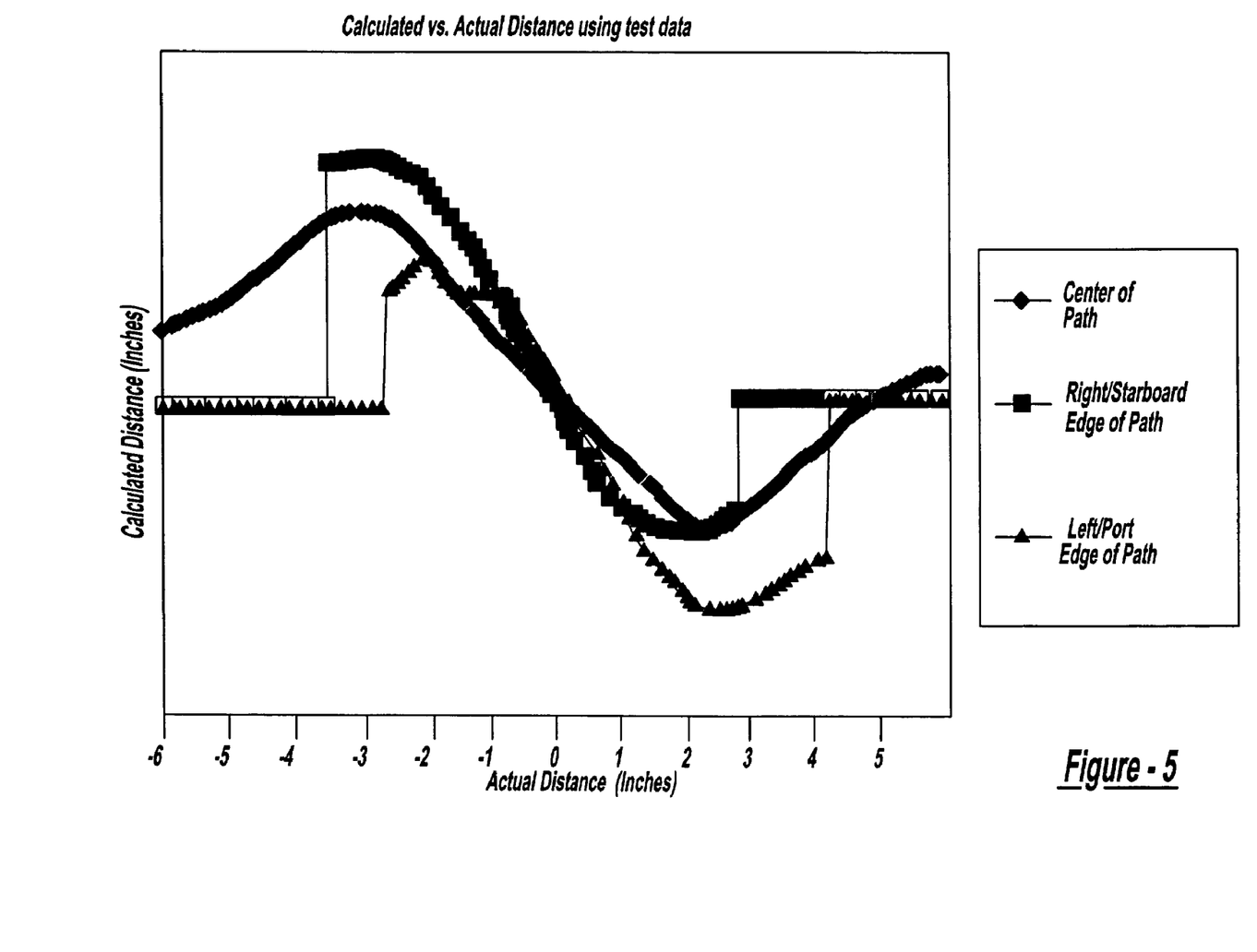
FIG. 5 is a graph illustrating the operable range of the guidance system.

As generally illustrated in FIG. 3, the signal processor 16 processes the sensor data to provide a motion control measurement representative of the offset or lateral displacement for use in a servo loop steering system. Inputs to the signal processor 16 include output signals A and B, as shown in FIG. 4, from the magnetic field sensors 28 and 30 respectively as well as output signals C and D, also shown in FIG. 4, from the ambient field sensors 40 and 42 respectively in order to discriminate valid magnetic signals from the magnetic field sensors 28 and 30. As is described in greater detail below, the non-linear output of the two magnetic field sensors 28 and 30 is communicated to the signal processor 16 which processes the sensor output and provides a linear result representative of the offset or later displacement of the vehicle guide point 38 relative to the path or marker 20. The orientation and operation of the sensor assembly 14 as well as the computational processes of the present invention are in some ways similar to the "X-coil" inductive pickup described in the assignee's U.S. Pat. No. 5,434,781, issued Jul. 18, 1995 and entitled "Method And Apparatus For Guiding A Driverless Vehicle Using A Sensor Tracking A Cable Emitting An Electromagnetic Field," the disclosure of which is expressly incorporated herein by reference. In contrast to the X-coil's inductive sensing of an alternating current as used in the '781 patent, the present invention relies on the magneto-resistive effect on a Wheatstone bridge for detecting the DC field of a magnetically marked path. Other notable differences between the '781 patent and the present invention include the fact that the device described in the '781 patent provides sinusoidal wave forms which are filtered and synchronously demodulated to provide a DC level to the processor whereas the output of the magnetic sensor bridges in the present invention provide a square wave that is DC voltage modulated about a bias point. As the present invention directly senses the DC field, no filtering is required. The signal processor 16 of the present invention performs demodulation by sensing both high and low voltages of the square wave and comparing them to a master clock signal which drives the flip of the magnetic field and ambient field sensors 28, 30, 40 and 42 whereas the device of the '781 patent demodulates the sensors with respect to the phase of one of the sensors. Additionally, since a DC magnetic field as sensed by the magnetic field sensors 28 and 30 may be due to an ambient field, the sensor assembly 14 includes additional ambient field sensors 40 and 42 to discriminate a valid path or marker 20 from relatively high uniform or ambient fields.

The computational processes performed by the present invention will now be described with reference to the output signals or measurements of the magnetic field and ambient field sensors 28, 30, 40, and 42 which are represented by output signals A, B, C, and D, respectively in FIG. 4. Measurement of output signals A, B, C, and D is performed by measuring the peak to peak output of the magnetic field and ambient field sensors 28, 30, 40, and 42, respectively, and assigning a positive or negative polarity to each sensor output as referenced to the flip coil signal of the sensors. This measurement defines the output signals A, B, C, and D for the following computations. When following the center of the path or marker 20, the signal processor 16 determines the offset (O) between the vehicle guide point 38 and the center of the path or maker 20 according to:

$$O = G(A-B)/(A+B), \text{ where } G=1$$

It should be noted that the above equation does not factor in the distance that the GMR device 24 is mounted above the path or marker 20, or in other words the sensor height 46, in the manner described in the '781 patent. It has been determined that over a change in sensor height 46, that is approximately equal to the operating signal range of the magnetic field sensors 28 and 30, there is only a very small change in the offset calculation. This small change is attributable, at least in part, to the small ratio of the width of the path 20 relative to the sensor height 46. Those skilled in the art will appreciate that incorporation of a height factor or sensor height 46 into the above equation may be used without departing from the scope of the invention as defined by the appended claims. For example, the scaling factor G may be empirically determined based on a nominal sensor height and media field strength to correct the sensor output to be an equal or scaled measurement of the offset.

When the vehicle 10 is following the right or starboard edge 50 of the path or marker 20, the right edge offset (OR) between the vehicle guide point 38 and the right edge 50 of the path or marker 20 is calculated by:

$$OR = G[(D-B)/(D+B)] + K$$

where G is a scaling gain (slope) dependent on the distance 44 between the right or starboard magnetic field sensor 30 and the right or starboard ambient field sensor 42, wherein for a distance 44 of one and three-quarter (1.75) inches, the scaling gain G is equal to one (1); and K is an offset, dependent on the width of the magnetic path or marker 20 and the sensor distance 44 to provide the same null position as the center of path offset calculation (O) above, wherein the offset K is equal to one and one-half (1.5) inches for a path width of two (2) inches and sensor height 46 of two (2) inches.

When following the left or port edge 48 of the path or marker 20, the left edge offset (OL) between the vehicle guide point 38 and the left edge 48 of the path or marker 20 is calculated by:

$$OL = G[(A-C)/(A+C)] - K$$

where G is a scaling gain (slope) dependent on the distance 44 between the left or port magnetic field sensor 28 and the left or port ambient field sensor 40, wherein for a distance 44 of one and three-quarter (1.75) inches, the scaling gain G is equal to one (1); and K is an offset, dependent on the width of the magnetic path or marker 20 and the sensor spacing 44 to provide the same null position as the center of path offset calculation (O) above, wherein the offset K is equal to one and one-half (1.5) inches for a path width of two (2) inches and sensor height 46 of two (2) inches.

More particularly, with regard to the sensor offset, the use of a two (2) inch wide magnetic tape as the path or marker 20 and a sensor height 46 of two (2) inches, the ambient field sensors 40 and 42 should be placed such that their major sensing axes 54 and 58 respectively cross the plane of the marker 20 at a minimum distance of approximately two (2) inches outside the edges 48 and 50 of the marker 20 respectively to prevent the ambient field sensors 40 and 42 from picking up a significant amount of signal emanating from the marker 20. In this configuration, the ambient field sensors 40 and 42 provide measurements that are representative of the ambient field, although they will be slightly higher than the ambient field in view of a residual pick-up from the path 20, this residual pick-up is generally small enough in comparison to the amplitude of the measurements of magnetic field sensors 28 and 30 that the signal may be used for discriminating whether the magnetic field sensors 28 and 30 are sensing an appropriately larger signal representative of the path 20. In general, as the path width increases, the spacing of the ambient field sensors 40 and 42 must also increase to provide representative ambient readings. If the readings from the ambient field sensors 40 and 42 are to be used to track the edges 48 and 50 of the path 20, the distance 44 must not be too large otherwise the ambient field sensors 40 and 42 would not be able to distinguish the path 20 from ambient field.

With the right edge of path offset equation (OR) and the left edge of path offset equation (OL) above, the guidance system 12 may determine the offset or lateral displacement of the vehicle 10, and more specifically the vehicle guide point 38, from either edge 48 or 50 of the path or marker 20 thereby permitting guidance along an edge 48 or 50 which is useful to smoothly move the vehicle 10 through areas where a path 20 splits into two path segments or joins another path segment.

With the above in mind, it should be appreciated that discrimination of the ambient field and the presence/absence of magnetic path may be done in a variety of ways. For example, with the sensor assembly 14 approximately centered over a magnetic path 20 and placed perpendicular to the path 20, the sum of (A+B) will be greater than (C+D). Spacing of the ambient field sensors 40 and 42 from the magnetic field sensors 28 and 30 by an appropriate distance 44 based on the width of the magnetic path 20, on the order of two (2) inches in the illustrated embodiment, will result in ambient field sensors 40 and 42 sensing only slightly greater than ambient field. This set-up can therefore be used to discriminate a valid path signal from a high ambient (or uniform) field. This set-up can also be used to indicate that the guidance system 12 is within a predetermined safe operating window that is, as a redundant test to the distance calculations given in offset equations (O), (OR), and (OL) above. The width of this window is determined by the distance 44 of ambient field sensors 40 and 42 from the GMR device 24, along with other factors such as sensor height 46 and width of path 20.

More particularly, output signals C and D can be used in a nulling circuit which is useful in increasing the sensitivity of the sensor assembly 14. For example, a measurement of output signal C and/or D, monitored by the signal processor 16, may be used to control the compensation coil currents of channels A, B, C, and D simultaneously until the compensation coil generates a field of equal magnitude and opposite sign to the ambient field experienced by channel C and/or D. By this method, any field experienced by channel C and/or D, assumed to be ambient, is nulled. Likewise, the equivalent field for channels A and B is also nulled. Assuming the distance and environment between the magnetic field and ambient field sensors 28, 30, 40, and 42 result in a consistent ambient field measurement between all sensors 28, 30, 40, and 42, this effectively nulls the ambient field. Once this is accomplished, the gain of all channels A–D may be increased using an automatic gain control to enable sensing of magnetic media with comparatively low field strength, since the measurable difference between path signal and ambient field is enhanced. Successive iteration of this process results in higher sensitivity for any field deviating from the ambient field.

The ambient field nullification and channel gain process also enhances the sensitivity of the guidance system 12 by regaining signal bandwidth previously occupied by ambient field data. Stated differently, removal of the common bias of channels A, B, C, and D in combination with automatic gain control allows higher sensitivity and precision. For example, with the use of the signal processor 16 the resolution of the analog to digital conversion and input amplitude define the precision to which the difference between measurements of the magnetic field and ambient field sensors 28, 30, 40 and 42 may be made.

The readings of output signals A and B may be used in conjunction with items described above, or simply raw predetermined thresholds as a verification of valid path presence and position. For example, in the sample data included in FIG. 4, a polarized field threshold of zero (0) may be defined experimentally to identify that output signals A or B must have amplitudes above this level to signify valid path signal.

Further, the action of the compensation coil, or the subtraction of a rectified bias, may be used to compensate for metal within the surroundings of the sensor assembly 14 which have similar effect to an ambient field and add to the ambient field measured. By this method, sensor performance may be made virtually impervious to usual mounting effects above and to the side of the sensor assembly 14.

As an alternative to following either the left edge 48 or right edge 50 of the path or marker 20 by calculating the left edge offset (OL) or right edge offset (OR), the guidance system 12 can be operated to track either edge 48 or 50 by maintaining a constant magnetic field reading from one sensor 28 or 30 respectively. In this manner, the guidance system 12 can maintain the position of the vehicle 10 relative to an edge 48 or 50. For example, to track the left edge 48, the guidance system 12 steers the vehicle 10 so as to maintain a constant magnetic field reading from the left sensor 28. More specifically, the guidance system 12 steers the vehicle 10 so as to constantly maintain a left sensor magnetic field reading which is equal to the running magnetic field average of the left sensor 28. Thus, if the left sensor 28 had a running magnetic field reading average of 89 Gauss, the guidance system 12 maintains the vehicle position with respect to the left edge 48 for a short amount of travel by steering the vehicle 10 so as to maintain a left sensor magnetic reading of 89 Gauss. Likewise, to track the right edge 50, the guidance system 12 steers the vehicle 10 so as to constantly maintain a right sensor magnetic field reading which is equal to the running magnetic field average of the right sensor 30. Thus, if the right sensor 30 had a running magnetic field reading average of 91 Gauss, the guidance system 12 maintains the vehicle position with respect to the right edge 50 for a short amount of travel by steering the vehicle 10 so as to maintain a right sensor magnetic reading of 91 Gauss.

Figure 6:
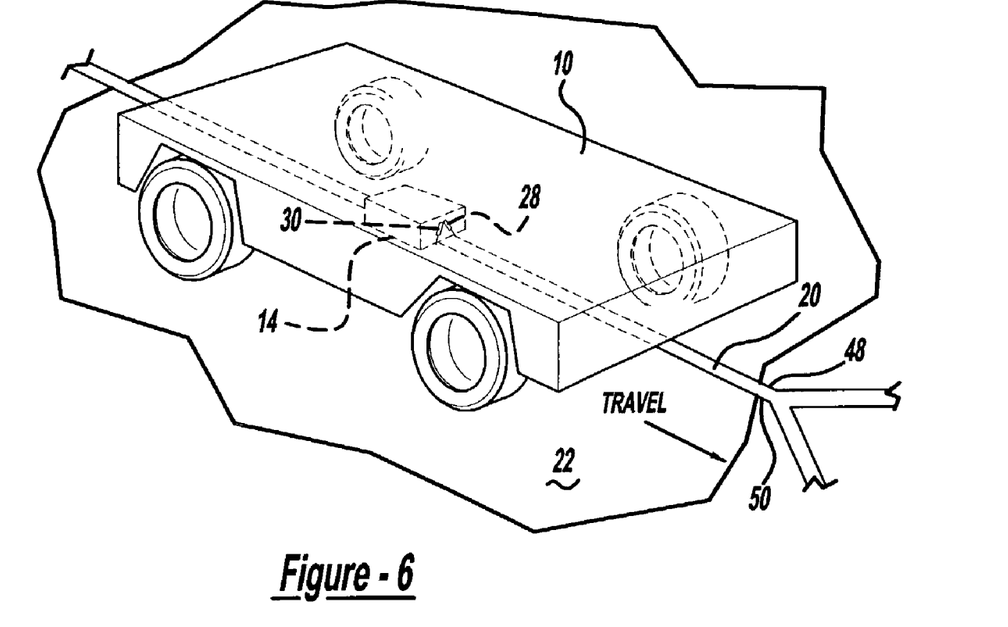
FIG. 6 is a perspective view of the driverless vehicle positioned in operative alignment with a magnetic marker having a forked or Y intersection.

This alternative method of tracking an edge 48 or 50 is particularly effective when the vehicle 10 is traveling through a forked or Y intersection in the path or marker 20 as illustrated in FIG. 6. When the vehicle is to track along the left branch at the intersection, the guidance system 12 steers the vehicle 10 seeking to maintain a constant left sensor magnetic field reading. Accordingly, the vehicle is constrained from diverting too far to the left as the left sensor magnetic field reading would decrease and is prevented from diverting too far to the right which would cause an increase in the field reading. The vehicle may be steered along the right branch of the intersection in a similar manner by maintaining a right sensor magnetic field reading.

As described above, magnetic field sensors 28 and 30 are preferably arranged in a "X" configuration. One alternative configuration is the arrangement of magnetic field sensors 28 and 30 in a "T" configuration wherein the major sensing axis of one magnetic field sensor is parallel to the path 20 or floor 22 while the major sensing axis of the other magnetic field sensor is perpendicular to the path 20 or floor 22. The "T" configuration is also usable for vehicle steering but has limitations when compared to the "X" configuration. For example, the operating range (port/starboard) is limited by the fact that the output pattern repeats, potentially causing a false null beyond the linear output range. However, similar guidance is possible using the "T" configuration for the GMR device 24. Likewise, a bank of closely spaced GMR devices, all located in a plane parallel to the floor 22, and perpendicular to the direction of vehicle travel, could be used to realize extended sensitivity but with the limitation of providing a coverage only as wide as the sensor assembly 14.

In addition to sensing a magnetically marked path 20, the invention may function to measure or indicate stopping position with a high degree of accuracy by orienting the sensor assembly 14 to sense fore/aft distance. From this modification, the invention is capable of sensing a magnetic path 20 to signal a stop. Additionally, the actual stopping position can be adjusted or anticipated based on measurement from the sensor assembly 14 to reliably position the vehicle 10 to a high degree of accuracy by controlling the vehicle's velocity loop. The sensor assembly 14 could also be used as a magnetic bar-code reader for location identification, including the size of targets as well as other target specific characteristics.

In addition, ambient field sensors 40 and 42 may be used to sense magnetic markers to provide information about the vehicle's current location. For example, a small cross-strip, polarized either in or out of phase with the main path 20 and placed on either side of the path 20, yields several determinable locations by creating a momentarily large polarized reading on either channels C or D.

As illustrated in FIG. 3, the signal processor 16 includes a digital signal processor (DSP) 60 for receiving output-signals A, B, C, and D from the magnetic field and ambient field sensors 28, 30, 40, and 42 and calculating the offset by way of the offset equations (O), (OR), or (OL) described above. The motion controller 18 receives a signal proportional to the offset calculations from the digital signal processor 60 and, in response, provides steering control signals, via a power amp 62 and a steering motor 64, to turn the steerable wheel and sensor assembly 14 attached to the steerable wheel.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A vehicle guidance system for guiding a vehicle along a magnetic marker comprising:
   a first magnetic sensor having a sensing axis, said first sensor measuring a first magnetic field;
   a second magnetic sensor having a sensing axis, said second sensor measuring a second magnetic field, said sensing axis of said second magnetic sensor crossing said sensing axis of said first magnetic sensor at a vehicle guide point;
   a third magnetic sensor laterally spaced from said guide point in a first direction, said third sensor measuring a third magnetic field, said third magnetic field comprising an ambient magnetic field; and
   a processor configured to receive data representative of the magnetic field measured by said first, second, and third sensors, to subtract the third magnetic field from one of the first and second magnetic fields to determine a nulled value, and to calculate a lateral offset between said guide point and the magnetic marker based upon the nulled value.

2. The vehicle guidance system of claim 1 further including a steering controller and wherein said processor further determines a steering control signal proportional to the lateral offset and communicates said steering control signal to said controller.

3. The vehicle guidance system of claim 1 wherein said first and second magnetic sensors have uncompensated magnetic field strength sensitivity equal to or greater than 16 (mV/V)/(kA/m).

4. The vehicle guidance system of claim 1 wherein said first and second magnetic sensors discriminate changes in magnetic field of 1 Gauss or less.

5. The vehicle guidance system of claim 1 wherein said first and second magnetic sensors discriminate changes in magnetic field of 10 milliGauss or less.

6. The vehicle guidance system of claim 1 wherein said first and second magnetic sensors are Wheatstone bridge sensors.

7. The vehicle guidance system of claim 1 including a dual bridge giant magnetoresistive device defining said first and second magnetic sensors.

8. The vehicle guidance system of claim 1 wherein said processor calculates said lateral offset by the equation $G(A-B)/(A+B)$, wherein A is the magnetic field measured by the first magnetic sensor and B is the magnetic field measured by the second magnetic sensor.

9. The vehicle guidance system of claim 1 wherein the third magnetic field approximates ambient magnetic field in the proximity of the third sensor or stray magnetic field from the vehicle.

10. The vehicle guidance system of claim 1 wherein said third magnetic field is less than the first and second magnetic fields.

11. The vehicle guidance system of claim 1 wherein said processor subtracts said third magnetic field from said first magnetic field when calculating the lateral offset and wherein the vehicle guidance system further includes a fourth sensor laterally spaced from said guide point in a direction opposite said third sensor, said fourth sensor measuring a fourth magnetic field, said processor being further configured to receive data representative of a fourth magnetic field measured by said fourth sensor and to subtract the fourth magnetic field from the second magnetic field when calculating the lateral offset.

12. The vehicle guidance system of claim 11 wherein the fourth magnetic field approximates ambient magnetic field in the proximity of the fourth sensor or stray magnetic field from the vehicle.

13. The vehicle guidance system of claim 1 wherein said processor is further configured to use said third measured magnetic field to guide the vehicle along an edge of the marker.

14. The vehicle guidance system of claim 13 wherein said processor calculates the lateral offset of the guide point from the edge of the marker by the equation $G[(A-C)/(A+C)]\pm K$, wherein A is the magnetic field measured by the first sensor, C is the magnetic field measured by the third sensor, and K is an offset dependent on the width of the marker.

15. The vehicle guidance system of claim 13 wherein said processor guides the vehicle along the edge of the marker by determining steering control signals in a manner intended to maintain the third magnetic field at a constant value.

16. A driverless vehicle configured to be guided along a magnetic marker, said vehicle comprising;
　a vehicle having a lateral centerline;
　a guidance system fixed to the vehicle, said guidance system including;
　　a first magnetic sensor having a sensing axis, said first sensor measuring a first magnetic field;
　　a second magnetic sensor having a sensing axis, said second sensor measuring a second magnetic field, said sensing axis of said second magnetic sensor intersecting said sensing axis of said first magnetic sensor at a vehicle guide point;
　　a third magnetic sensor laterally spaced from said guide point in a first direction, said third sensor measuring a third magnetic field, said third magnetic field comprising an ambient magnetic field; and
　　a processor configured to receive data representative of the magnetic field measured by said first, second, and third sensors, to subtract the third magnetic field from one of the first and second magnetic fields to determine a nulled value, and calculate a lateral offset between said guide point and the magnetic marker based upon the nulled value.

17. The vehicle guidance system of claim 16 further including a steering controller and wherein said processor further determines a steering control signal proportional to the lateral offset and communicates said steering control signal to said controller.

18. The vehicle guidance system of claim 16 wherein said first and second magnetic sensors have uncompensated magnetic field strength sensitivity equal to or greater than 16 (mV/V)/(kA/m).

19. The vehicle guidance system of claim 16 wherein said first and second magnetic sensors discriminate changes in magnetic field of 1 Gauss or less.

20. The vehicle guidance system of claim 16 wherein the third magnetic field approximates ambient magnetic field in the proximity of the third sensor or stray magnetic field from the vehicle.

21. A vehicle guidance system for guiding a vehicle along a magnetic marker having a pair of opposite edges, said vehicle guidance system comprising:
　a first magnetic sensor having a sensing axis, said first sensor measuring a first magnetic field;
　a second magnetic sensor having a sensing axis, said second sensor measuring a second magnetic field, said sensing axis of said second magnetic sensor crossing said sensing axis of said first magnetic sensor at a vehicle guide point;
　a third magnetic sensor laterally spaced from said guide point in a first direction, said third sensor measuring a third magnetic field comprising an ambient magnetic field; and
　a processor configured to receive data representative of the magnetic field measured by said first, second, and third sensors and to use the third measured magnetic field to guide the vehicle along one of the marker edges.

22. The vehicle guidance system of claim 21 further including a steering controller and wherein said processor further determines a steering control signal proportional to the running average of the first magnetic field and the second magnetic field and communicates said steering control signal to said controller.

23. The vehicle guidance system of claim 21 wherein said processor uses the third measured magnetic field to calculate a lateral offset of the guide point from one of the marker edges for guiding the vehicle along one of the marker edges, said calculation being based on the equation $G[(A-C)/(A+C)]\pm K$, wherein A is the magnetic field measured by the first sensor, C is the magnetic field measured by the third sensor, and K is an offset dependent on the width of the marker.

24. The vehicle guidance system of claim 21 wherein said processor guides the vehicle along one of the marker edges by determining steering control signals in a manner intended to maintain the third magnetic field at a constant value.

25. A method for guiding a vehicle in response to a marker having magnetic field comprising the steps of:
measuring magnetic field strength proximate the marker;
measuring ambient magnetic field strength remote from the marker;
nulling the ambient magnetic field by removing the remote magnetic field strength from the proximate magnetic field strength;
calculating a lateral displacement between the vehicle and the marker using the nulled magnetic field strength; and
guiding the vehicle in response to the lateral displacement between the vehicle and the marker.

26. The method of claim 25 including the step of measuring magnetic field strength proximate to the marker of 16 (mV/V)/(kA/m) or less.

27. The method of claim 25 further including the step of guiding the vehicle along one of the opposite marker edges by determining steering control signals in a maimer intended to maintain the magnetic field strength proximate the marker at a constant value.

28. The method of claim 25 wherein the marker has a pair of opposite edges and including the steps of calculating a lateral displacement between the vehicle and one of the pair of opposite marker edges using the nulled magnetic field strength, and guiding the vehicle along said one of the pair of opposite marker edges.

29. The method of claim 28 wherein the step of calculating a lateral displacement is based upon the equation $C[(A-C)/(A+C)]\pm K$, wherein A is the magnetic field measured by the first sensor, C is the magnetic field measured by the third sensor, and K is an offset dependent on the width of the marker.

* * * * *

UNITED STATES PATENT AND TRADEMARK OFFICE
CERTIFICATE OF CORRECTION

PATENT NO. : 6,971,464 B2
DATED : December 6, 2005
INVENTOR(S) : Mark Marino et al.

It is certified that error appears in the above-identified patent and that said Letters Patent is hereby corrected as shown below:

Title page,
Item [56], References Cited, OTHER PUBLICATIONS, please insert
-- Website Publication dated Dec. 18, 2000 for Yazaki (1 page) --.

Column 11,
Line 62, "third" should be -- second --.
Lines 64 and 67, ";" should be -- : --.

Column 13,
Line 4, "third" should be -- second --.

Column 14,
Line 3, "maimer" should be -- manner --.
Line 14, "$C[(A-C)/(A+C)]\pm K$" should be -- $G[(A-C)/(A+C)]\pm K$ --.

Signed and Sealed this

Seventh Day of February, 2006

JON W. DUDAS
*Director of the United States Patent and Trademark Office*